United States Patent
Agarwal

(10) Patent No.: US 6,559,204 B1
(45) Date of Patent: May 6, 2003

(54) AUTODEPOSITABLE AQUEOUS COMPOSITIONS INCLUDING DISPERSED NON-FILM-FORMING POLYMERS

(75) Inventor: Rajat K. Agarwal, Sterling Heights, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/787,987

(22) PCT Filed: Sep. 23, 1999

(86) PCT No.: PCT/US99/22069

§ 371 (c)(1),
(2), (4) Date: Mar. 23, 2001

(87) PCT Pub. No.: WO00/17269

PCT Pub. Date: Mar. 30, 2000

Related U.S. Application Data

(60) Provisional application No. 60/101,550, filed on Sep. 23, 1998.

(51) Int. Cl.[7] ............... C08J 9/32; C08K 9/00; C04B 9/02; B05D 1/18; B05D 3/10
(52) U.S. Cl. ............. 523/218; 523/206; 106/14.14; 106/14.44; 427/340; 427/341; 427/419.8; 427/443.1
(58) Field of Search ................. 106/14.14, 14.44; 523/206, 218; 427/340, 341, 419.8, 443.1

(56) References Cited

U.S. PATENT DOCUMENTS

| 4,427,836 A | 1/1984 | Kowalski et al. ........... 525/301 |
| 4,637,839 A | 1/1987 | Hall ........................... 148/6.2 |
| 4,800,106 A | 1/1989 | Broadbent ............... 427/388.1 |
| 4,885,320 A | 12/1989 | Biale .......................... 523/201 |
| 4,898,892 A | 2/1990 | Melber et al. ................ 521/54 |
| 5,248,525 A | 9/1993 | Siebert ....................... 427/337 |
| 5,342,694 A | 8/1994 | Ahmed et al. .............. 428/461 |
| 5,667,845 A | 9/1997 | Roberto et al. ............. 427/337 |
| 6,036,767 A | 3/2000 | Inoue et al. ................ 106/498 |
| 6,133,342 A | 10/2000 | Mizobuchi et al. ......... 523/161 |

*Primary Examiner*—Tae H. Yoon
(74) *Attorney, Agent, or Firm*—Stephen D. Harper; Arthur G. Seifert

(57) ABSTRACT

An autodepositing liquid composition comprises dispersed non-film-forming polymer particles in addition to the dispersed film forming polymer characteristic of all autodepositing liquid compositions. Preferably, the non-film-forming polymer particles are gas-tight microballoons filled with a gas such as air and have an average particle size less than 1 $\mu$m. Such particles act in the autodepositing liquid compositions and in the dried coatings formed from them as opaque white pigments, unless the coatings are heated above about 130° C., if so heated, the coatings, unless they contain other heat stable pigment, become irreversibly transparent.

20 Claims, No Drawings

AUTODEPOSITABLE AQUEOUS COMPOSITIONS INCLUDING DISPERSED NON-FILM-FORMING POLYMERS

This application is a 371 of PCT/US99/22069 filed on Sep. 23, 1999 which claims benefit of Ser. No. 60/101,550 filed on Sep. 23, 1998.

FIELD AND BACKGROUND OF THE INVENTION

This invention relates to the use of autodepositable aqueous liquid compositions that are both dispersions and solutions in water. By mere contact with these autodepositable liquid compositions, active metal surfaces can be coated with an adherent polymer film that increases in thickness the longer the time of contact, even though the aqueous liquid composition is stable for a long time against spontaneous precipitation or flocculation of any solid phase, in the absence of contact with active metal. (For the purposes of this specification, the term "active metal" is to be understood in its broadest sense as including all metals and alloys more active than hydrogen in the electromotive series, or, in other words, a metal which is thermodynamically capable of dissolving to produce dissolved cations derived from the metal, with accompanying evolution of hydrogen gas, when contacted with an aqueous solution of a non-oxidizing acid in which the activity of hydrogen ions is 1.00 equivalent per liter.) Such liquid compositions are denoted in this specification, and commonly in the art, as "autodeposition" or "autodepositing" compositions, dispersions, emulsions, suspensions, baths, solutions, or a like term. Autodeposition is often contrasted with electrodeposition, which can produce very similar adherent films but requires that the surface to be coated be connected to a source of direct current electricity for coating to occur.

It is generally believed in the art that autodeposition works because the cations dissolving from the metal surface to be coated are, of course, initially confined to the volume of contacting liquid in the immediate vicinity of the metal surface from which they are dissolving, and these recently dissolved cations interact with the liquid autodepositing composition in at least one of the following ways: (i) The dissolved cations precipitate previously dissolved polymers by displacing previously associated cations or cation-forming moieties, in association with which the polymers are soluble, by the newly dissolved cations in association with which the polymers are much less soluble; and/or (ii) the dissolved cations destabilize numerous individual dispersed phase units in a dispersion of a polymer with inherently low water solubility, which nevertheless can remain in stable suspension for a long time in the absence of dissolved polyvalent cations, because the outer surfaces of the dispersed phase units carry a net negative electrical charge, derived from anionic components of the dispersed polymer itself and/or from an anionic dispersing agent used to prepare the autodepositing composition in question. The net negative charge on the units of the dispersed phase in an autodepositing liquid composition is believed to be electrically counterbalanced by a diffuse excess of cations, usually monovalent cations, in the surrounding continuous phase of the dispersion. This excess of cations together with the negative charges on the dispersed phase units constitutes an example of the well known "electrical double layer" or "Helmholz double layer" that is characteristic of most interfaces between liquid phases containing charged solute particles and solids in contact with such liquid phases. As long as this double layer remains intact, the net negative charge on the exterior of each unit of the dispersed phase causes it to repel other units of the dispersed phase that also carry a net negative charge, and thereby prevents spontaneous coalescence of the dispersed phase units.

When the double layer is sufficiently disturbed (or in the case of a soluble polymer, when the solubility is reduced) by introduction of new cations, the polymeric parts of numerous dispersed phase units and/or solute polymer molecules aggregate. Aggregated polymer molecules, along with some of the liquid in which they were dissolved or dispersed, form initially a wet coating layer with at least sufficient cohesion to resist completely draining away under the influence of the Earth's gravity. Upon further drying, this wet coating layer forms a continuous dry solid film, if the chemical nature of the polymer favors such a transition and the temperature during drying is sufficiently far above the glass transition temperature of the polymer concerned. Polymers that have this property of forming a continuous solid film or body from initially finely dispersed or dissolved particles of the polymer in a liquid dispersion medium or solvent are defined as "film-forming" polymers, and at least one such polymer is a necessary constituent of every conventional autodeposition bath. The continuous solid film formed by the film-forming polymer content of an autodeposition bath may constitute the entire solidified and cured autodeposited coating, and any instance normally constitutes the only continuous solid phase of the solidified and cured autodeposited coating. It is quite common for a cured autodeposited coating also to include at least one discontinuous phase, most often a pigment such as carbon black.

In other kinds of polymers, both coatings and solid objects, it is common to include a discontinuous solid phase, usually called "filler" or "reinforcement", that is dispersed in the continuous polymer phase and acts to alter the properties of the composite formed by the continuous and discontinuous solid phases from those that prevail in the continuous phase only. In many instances, it is possible both to reduce the cost per unit volume and to increase the mechanical strength by including in a polymer a mineral filler such as clay, calcium carbonate, or the like. Although the inclusion of such materials in an autodeposited coating has been taught in prior patents, it is not believed that any use of dispersed solid phases in autodeposition baths has attained profitably practical success for any purpose except pigmentation. The use of two or more types of film-forming resins in an autodeposition bath has also been taught, but again is not believed to have achieved profitably practical success.

One major object of this invention is to provide autodepositing liquid compositions from which it is possible to deposit on contacted metal surfaces coatings that contain dispersed solid phases, which provide for autodeposited coatings at least some of the advantages practically achieved in other uses of polymers by the inclusion of fillers and/or by the use of composite structures containing more than one type of polymer. Other alternative and/or concurrent objects will be apparent from the further description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.; and the first definition of an acronym or other abbreviation applies to all subsequent uses of the same acronym or other abbreviation.

BRIEF SUMMARY OF THE INVENTION

It has been found that at least one of the major objects of the invention can be achieved by including in an autodeposition bath a suitable quantity of non-film-forming dispersed organic material that codeposits with the film-forming-resin(s) also present in the autodeposition bath into the wet autodeposited film.

DETAILED DESCRIPTION OF THE INVENTION

An autodepositing liquid composition according to the present invention comprises, preferably consists essentially of, or more preferably consists of, water and the following components:

(A) at least 1.0%, based on the whole composition, of a component of dissolved, dispersed, or both dissolved and dispersed film forming polymer molecules;

(B) an emulsifying agent component in sufficient quantity to emulsify any water insoluble part of any other component so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal that reacts with the autodepositing liquid composition to produce therein dissolved metal cations with an electrical charge of at least two;

(C) a dissolved accelerator component selected from the group consisting of acids, oxidizing agents, and complexing agents that are not part of immediately previously recited components (A) or (B), this accelerator component being sufficient in oxidizing tendency and amount to impart to the total autodepositing liquid composition an oxidation-reduction potential that is at least 100 millivolts (hereinafter usually abbreviated as "mV") more oxidizing than a standard hydrogen electrode; and (D) a component of dispersed non-film-forming organic particles that are not part of any of immediately previously recited components (A) through (C); and, optionally, one or more of the following components:

(E) a component of pigment, filler, or other dispersed solid phase materials other than materials that constitute any part of any of immediately previously recited components (A) through (D);

(F) a component of dyes or other dissolved coloring materials other than materials that constitute any part of immediately previously recited components (A) through (E);

(G) a component of coalescing agent, other than materials that constitute any part of immediately previously recited components (A) through (F);

(H) a component of solvent, other than materials that form any part of immediately previously recited components (A) through (G), in which at least one constituent of either or both of components (A) and (D) that is insoluble in water was dissolved during some operation in the preparation of the autodepositing liquid composition; and (J) a plasticizer component, other than materials that constitute part of immediately previously recited components (A) through (H).

In this description: The phrase "dispersed or dissolved and dispersed film forming polymer molecules" means that the molecules so described, when separated from any other materials with which they may be co-dispersed or co-dissolved and co-dispersed and in the form of a layer at least 5 millimeters thick of a homogeneous liquid mixture in which the polymers constitute at least 5% of the mass of the mixture, will spontaneously form a continuous body that is solid at 30° C. upon drying or other removal of the water, at a temperature of at least 30° C., from said layer; the term "component of solvent" means a single phase, consisting of a single chemical substance or a mixture of chemical substances, that (i) is liquid at 25° C. and (ii) is not constituted exclusively of water and inorganic solutes only; and the term "coalescing agent" means a material that (i) is liquid at 100° C., (ii) has a boiling point at normal atmospheric pressure that is at least 110° C. or preferably, with increasing preference in the order given, at least 120, 130, 140, 150, 160, or 165° C. and independently is not more than 300° C., or preferably, with increasing preference in the order given, not more than 290, 280, 270, 265, 260, 255, 250, 245° C., and (iii) promotes the formation of dry coatings without coating irregularities (such as craters, popped blisters, thick spots, bare spots, or the like) that are readily detectable with normal unaided human vision, as determined by comparison of the density of coating irregularities obtained, under identical processing conditions, by (iii.i) autodeposition from an autodepositing liquid composition containing the material being tested for its coalescing properties, followed by cure of the film thus deposited and (iii.ii) an otherwise identical process in which the material being tested for its coalescing properties is replaced, in the autodepositing liquid composition used in the process, by an equal mass of water.

In addition to a complete autodepositing liquid composition as described above, another embodiment of the invention is a liquid replenisher composition useful to replace film forming polymer and other materials consumed by use of an autodepositing liquid composition according to the invention and/or to make a working composition according to the invention by dilution with water and, optionally, addition of other materials. Such a liquid replenisher composition according to the invention comprises, preferably consists essentially of, or more preferably consists of, water and:

(A') at least 10%, based on the whole composition, of dissolved, dispersed, or both dissolved and dispersed film forming polymer molecules;

(B') an emulsifying agent component in sufficient quantity to emulsify any water insoluble part of any other component so that, in the liquid replenisher composition, no separation or segregation of bulk phases that is perceptible with normal unaided human vision occurs during storage at 25° C. for at least 24 hours after preparation of the liquid replenisher composition, in the absence of contact of the liquid replenisher composition with any metal that reacts with the liquid replenisher composition to produce therein dissolved metal cations with a charge of at least two; and (D') a component of dispersed non-film-forming organic particles that are not part of either of immediately previously recited components (A') or (B'); and, optionally, one or more of the following components:

(C') a dissolved accelerator component selected from the group consisting of acids, oxidizing agents, and complexing agents that are not part of any of immediately previously recited components (A'), (B'), or (D'), (E') a component of pigment, filler, or other dispersed solid phase materials other than the materials that constitute any part of any of immediately previously recited components (A') through (D');

(F') a component of dyes or other dissolved coloring materials other than materials that constitute any part of immediately previously recited components (A') through (E');

(G') a component of coalescing agent, other than materials that constitute any part of immediately previously recited components (A') through (F');

(H') a component of solvent, other than materials that form any part of immediately previously recited components (A') through (G'), in which constituents of either or both of components (A') and (D') that are insoluble in water were dissolved during some operation in the preparation of the liquid replenisher composition; and (J') a plasticizer component, other than materials that constitute part of immediately previously recited components (A') through (H').

Ordinarily each component of a preferred replenisher composition identified by a primed letter immediately above will preferably have the same chemical composition for each component as for the component with the same unprimed letter in the working composition, as described further above, that is to be replenished with or made up from the replenisher composition. Therefore, the description below of preferred constituents for each component and subcomponent thereof in chemical terms will be given explicitly only for unprimed components and subcomponents, but applies equally to primed components with the same letter unless otherwise stated. The ratios among the various components, however, may be different between replenisher and working compositions, in order to compensate for more rapid consumption of some constituents of a working composition than for other constituents of the same composition when the working composition is used. Ratios between or among subcomponents of a single major component may also be different in the replenisher than in the working composition that is replenished with it, if the rates of consumption of the subcomponents from a working autodepositing liquid composition are not in proportion to the concentrations of these ingredients in the working autodepositing liquid composition. In all cases, the concentrations of all components except water that are present in a replenisher composition normally preferably are larger than the concentration for the corresponding component in an autodepositing liquid working composition according to the invention by a factor that is at least, with increasing preference in the order given, 1.5, 2.0, 2.5, 3.0, 3.5, 4.0, 4.5, or 5.0 and independently preferably is not more than, with increasing preference in the order given, 20, 15, 10, 8, or 6. If the concentration of components other than water in a replenisher composition is too low, the cost of shipping it will be higher than is economically justified, while if the concentration of these components is too high, storage stability will be reduced.

A replenisher composition as described immediately above that is to be stored for several weeks or more before use preferably does not contain optional component (C') or any subcomponents thereof as described below, because all of these subcomponents are detrimental to storage stability of the replenisher composition. The accelerator components are therefore preferably provided to a working autodepositing liquid composition according to this invention from at least one separate replenisher composition to maintain substantially constant values of oxidizing power and fluoride Components (A), (B), and (C) as described above are conventional for autodeposition baths, and suitable and preferred chemical compositions for them are taught in one of more of the following U.S. Patents and Patent Applications, the entire disclosures of which, to the extent not contrary to any explicit statement herein, are hereby incorporated herein by reference: application Ser. No. 09/029,708, now abandoned, and application Ser. No. 08/740,522; International Application Number PCT/US96/12540; and U.S. Pat. Nos. 6,143,365, 6,033,492, 5,945,170, 5,786,030, 5,760,624, 5,688,560, 5,667,845, 5,646,211, 5,578,199, 5,545,319, 5,538,644, 5,372,853, 5,510,410, 5,427,863, 5,409,737, 5,393,416, 5,385,798, 5,372,853, 5,342,694, 5,300,323, 5,248,525, 5,164,234, 5,114,751, 5,080,937, 5,061,523, 5,011,715, 4,994,521, 4,800,106, 4,758,621, 4,661,385, 4,637,839, 4,632,851, 4,564,536, 4,562,098, 4,554,305, 4,414,350, 4,411,950, 4,373,050, 4,366,195, 4,357,372, 4,347,172, 4,318,944, 4,243,704, 4,242,379, 4,229,492, 4,206,169, 4,199,624, 4,191,676, 4,186,226, 4,186,219, 4,178,400, 4,177,180, 4,160,756, 4,108,817, 4,104,424, 4,030,945, 4,012,351, 3,960,610, 3,955,532, 3,936,546, 3,914,519, 3,839,097, 3,795,546, 3,776,848, 3,791,431, 3,592,699, and 3,585,084.

In a first especially preferred embodiment of this invention, a polymer molecule of component (A) preferably includes a subcomponent[1] (A1) selected from residues of ---
[1] The term "subcomponent" when used herein does not necessarily imply that the material so designated can not constitute the entire component of which it is described as a subcomponent, except when further qualified, for example by specifying a portion less than 100% of the total component that is constituted by the subcomponent. In this particular instance, the term subcomponent refers to one or more portions of a single polymer molecule having a particular structure identifiable as a "residue" of a particular kind of monomer that includes a polymerizable carbon-carbon double bond. A chemical compound (monomer) conforming to the general chemical formula:

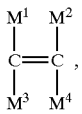

where each of $M^1$, $M^2$, $M^3$, and $M^4$ independently represents any monovalent moiety, provided that the moieties do not preclude addition polymerization of the double bond shown in the general formula, when it is polymerized forms a moiety conforming to the general chemical formula:

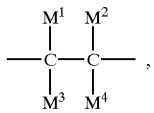

where each of $M^1$ through $M^4$ has the same meaning as in the general formula for the compound given next above and the open bonds shown on the carbon atoms are attached to other moieties of the polymer molecule. This moiety is defined as the "residue" in the polymer molecule of the compound or monomer conforming to the general chemical formula first shown in this note. polymerization of acrylic and methacrylic acids and the salts of both of these acids, in order to promote cross-linking reactions during the drying and curing of the autodeposited coatings eventually formed. Methacrylic acid is most preferred for this subcomponent. The average percentage of residues of subcomponent (A1) in component (A) overall preferably is at least, with increasing preference in the order given, 0.50, 1.0, 1.5, 2.0, 2.5, 3.0, 3.5, 4.0, 4.5, or 4.9 and independently preferably is not more than, with increasing preference in the order given, 15, 10, 9.0, 8.0, 7.0, 6.5, 6.0, 5.5, or 5.1. If the percentage of subcomponent (A1) is too low, the autodeposited coating formed is likely to have less heat resistance than is desired, while if this percentage is too high, the autodeposited coating formed is likely to be more susceptible to damage from mechanical shocks than is desired.

A polymer molecule of component (A) for this first especially preferred embodiment preferably further includes a subcomponent (A2) selected from residues of polymerization of esters of acrylic and methacrylic acids with alcohols that contain at least, with increasing preference in the order given, 4, 5, 6, 7, or 8 carbon atoms per molecule and independently preferably contain not more than, with increasing preference in the order given, 20, 18, 16, 14, 12, or 10 carbon atoms per molecule. Further and independently, the alcohols corresponding to the esters of subcomponent (A2) preferably are not straight chain alcohols, but instead preferably contain at least one branch off the longest carbon-carbon chain in a molecule of the alcohol, this branch independently being most preferably in the 2 position and preferably at least two carbon atoms long. Residues of 2-ethylhexyl acrylate are most particularly preferred for this subcomponent. Independently of its exact chemical nature, the percentage of the total component (A) that is constituted of subcomponent (A2) portions of the molecules that constitute component (A) preferably is at least, with increasing preference in the order given, 5, 10, 15, 20, 23, 26, 29, or 32 and independently preferably is not more than, with increasing preference in the order given, 60, 50, 45, 42, 39, 36, or 34. If the percentage of subcomponent (A2) is too low, the autodeposited coating formed is likely to be more susceptible to damage from mechanical shock than is desirable, while if the percentage of subcomponent (A2) is too high, the heat resistance of the autodeposited coating formed is likely to be lower than is desirable.

Molecules of component (A) for this first especially preferred embodiment of the invention further preferably, primarily for reasons of economy, include a subcomponent (A3) selected from residues of addition-polymerizable hydrocarbon molecules, which more preferably, in order to promote heat resistance of the autodeposited coating eventually formed, are molecules of hydrocarbons including an aromatic nucleus. The single most preferred hydrocarbon comonomer is styrene. The percentage of subcomponent (A3) in component (A) as a whole preferably is at least, with increasing preference in the order given, 10, 15, 20, 23, 26, 29, 32, or 35 and independently preferably is not more than, with increasing preference in the order given, 60, 50, 47, 44, 41, or 38. If the percentage of subcomponent (A3) is too large, both heat resistance and susceptibility to damage from mechanical shocks are likely to be lower than desirable for the autodeposited coatings formed from the composition, while if the percentage of subcomponent (A3) is too low, the coatings produced will usually be more costly than is economically justified by any performance improvement observed.

Molecules of component (A) for this first especially preferred embodiment of the invention further preferably include a subcomponent (A4) of residues of acrylic monomers that are not part of either subcomponent (A1) or (A2) as described immediately above. The single most preferred residues are those of acrylonitrile. The percentage of subcomponent (A4) in component (A) as a whole preferably is at least, with increasing preference in the order given, 5, 10, 13, 15, 17, 19, 21, or 23 and independently preferably is not more than, with increasing preference in the order given, 50, 45, 40, 35, 32, 30, 28, or 26.

In a second especially preferred alternative embodiment, component (A) is selected from molecules including residues of vinylidene chloride to constitute from 50 to 99% of the mass of the molecules and residues of sulfoethylmethacrylate to constitute from 0.1 to 5% of the mass of the molecules, optionally also including residues of one or more other comonomers selected from the group consisting of vinyl chloride, acrylonitrile, acrylamides, and methacrylamides.

Component (B) as described above may be incorporated into component (A) by copolymerizing with the other monomers described for component (A) an ionic significantly water-soluble material which is selected from the group of sulfonic acids and their salts having the following general formula:

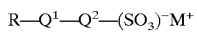

wherein the moiety "R" is selected from the group consisting of vinyl and substituted vinyl, for example, alkyl-substituted vinyl; the symbol "$Q^1$" represents a difunctional linking group which will activate the double bond in the vinyl group; "$Q^2$" represents a divalent hydrocarbon moiety having its valence bonds on different carbon atoms; and the symbol "$M^+$" represents a cation. Sodium sulfoethyl methacrylate of the formula:

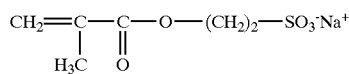

is a highly preferred copolymerizable material for use as component (B) to form "self-emulsifying" polymers or "self-stabilizing" latexes. More details about using this type of emulsifying component are given in U.S. Pat. No. 4,800, 106 of Jan. 24, 1989, column 7 line 45 through column 8 line 49. Contrary to the state of the autodeposition art when using coating resins that contain predominantly vinylidene chloride residues, however, if acrylic coating resins are used in this invention, conventional external emulsifying agents are usually as satisfactory as the internal emulsifying agents that are copolymerized as part of the polymer molecules themselves. More particularly, the emulsifying agents and amounts thereof used by commercial suppliers of acrylic latexes are generally satisfactory and preferred for use in this invention, the preference being primarily due to cost savings from not having to prepare a special polymer for use in autodeposition only. These commercially used emulsifying agents are usually proprietary, but they are all believed to be anionic surfactants and most are believed to include arylsulfonic acid groups.

Accelerator component (C) as described above may be selected from any material or combination of materials known for the purpose in prior autodeposition art or otherwise found to give satisfactory results. The most preferred component (C) contains the following three subcomponents:

(C1) a concentration of fluoride ions that in a working autodeposition bath is at least, with increasing preference in the order given, 0.4, 0.8, 1.0, 1.2, 1.40, 1.50, 1.55, 1.60, 1.65, 1.70, 1.75, or 1.79 grams of fluoride ions per liter of total autodeposition bath, a concentration unit that may be used hereinafter for any other constituent as well as for fluoride ions and is hereinafter usually abbreviated as "g/l" and independently preferably is not more than, with increasing preference in the order given, 5, 4.0, 3.6, 3.3, 3.0, 2.8, 2.60, 2.50, 2.40, 2.30, 2.25, 2.20, 2.15, 2.10, 2.05, 2.00, 1.95, 1.90, or 1.85 g/l of fluoride ions (the entire fluorine atom content of any source of fluorine in anions dissolved in an autodeposition bath according to the invention is to be considered as fluoride ions for the purpose of testing conformance to these preferred concentrations of fluoride ions, irrespective of the actual extent of ionization, aggregation, formation of complex ions, or the like that may occur);

(C2) an amount of oxidizing agent, preferably selected from the group consisting of hydrogen peroxide and ferric ions, sufficient to provide to the working autodepositing liquid composition an oxidation potential, measured by the potential of a platinum or other inert metal electrode in contact with the autodepositing liquid composition, that is, with increasing preference in the order given, at least 150, 175, 200, 225, 250, 275, 300, 325, 340, or 350 mV more oxidizing than a standard hydrogen electrode and independently preferably is, with increasing preference in the order given, not more than 550, 525, 500, 475, 450, 425, 410, or 400 mV more oxidizing than a standard hydrogen electrode; and (C3) a source of hydrogen cations in an amount sufficient to impart to the autodeposition bath a pH that is at least, with increasing preference in the order given, 1.0, 1.4, 1.6, 1.8, or 2.0 and independently preferably is not more than, with increasing preference in the order given, 3.8, 3.6, 3.4, 3.2, 3.0, 2.8, or 2.6.

It should be understood that subcomponents (C1) through (C3) need not all be derived from different materials. Hydrofluoric acid, in particular, is preferred as a source for both (C1) and (C3), and ferric fluoride, which can be made by dissolving iron in hydrofluoric acid, can supply both (C1) and (C2).

Most preferably, ferric cations, hydrofluoric acid, and hydrogen peroxide are all used to constitute component (C).

In a working composition according to the invention, independently for each constituent: the concentration of ferric cations preferably is at least, with increasing preference in the order given, 0.5, 0.8, 1.0, 1.20, 1.30, 1.40, or 1.45 g/l and independently preferably is not more than, with increasing preference in the order given, 2.95, 2.90, 2.85, 2.80, 2.75, 2.70, 2.65, 2.60, 2.55, or 2.50 g/l; the concentration of fluorine in anions preferably is at least, with increasing preference in the order given, 0.5, 0.8, 1.0, 1.2, 1.4, 1.50, 1.55, 1.60, 1.65, 1.70, 1.75, or 1.79 g/l and independently preferably is not more than, with increasing preference in the order given, 10, 7.0, 5.0, 4.0, 3.0, 2.75, 2.50, 2.40, 2.30, 2.20, 2.15, 2.10, 2.05, 2.00, 1.95, 1.90, 1.85, or 1.81 g/l; and the amount of hydrogen peroxide added[2] to a freshly prepared working composition preferably is at least, with increasing preference in the order given, 0.050, 0.10, 0.20, 0.30, 0.40, 0.50, 0.54, or 0.57 g/l and independently preferably is not more than, with increasing preference in the order given, 2.1, 1.8, 1.5, 1.2, 1.00, 0.90, 0.80, 0.70, 0.65, or 0.61 g/l.

[2]Because of numerous chemical reactions, including spontaneous decomposition, in which hydrogen peroxide can participate, its concentration as analytically determined will often be considerably less than corresponds to the amount added.

Component (D) as described above preferably comprises, more preferably consists essentially of, or still more preferably consists of, particles with an average particle size (i.e., largest linear dimension) that is at least, with increasing preference in the order given, 0.05, 0.10, 0.20, 0.25, 0.30, 0.35, or 0.40 micrometres (hereinafter usually abbreviated as "$\mu$m") and independently preferably is not more than, with increasing preference in the order given, 4.0, 3.0, 2.0, 1.0, 0.80, 0.70, 0.65, 0.60, or 0.55 $\mu$m. Independently of the actual size, a narrow size distribution is preferred. More particularly, independently for each preference stated: (i) at least, with increasing preference in the order given, 50, 65, 70, 75, 80, 85, 90, or 95 number percent of the particles have a size that is at least 62% of the average size; (ii) at least, with increasing preference in the order given, 40, 50, 60, 65, 70, 75, 80, or 85 number percent of the particles have a size that is at least 76% of the average size; (iii) at least, with increasing preference in the order given, 20, 30, 40, 45, 50, 55, or 60 number percent of the particles have a size that is at least 86% of the average size; (iv) not more than, with increasing preference in the order given, 40, 30, 25, 20, or 15 number percent of the particles have a size that is at least 114% of the average size; (v) not more than, with increasing preference in the order given, 20, 15, 12, 10, 8, 6, or 4 number percent of the particles have a size that is at least 124% of the average size; and (vi) not more than 1 number percent of the particles have a size that is at least 170% of the average size.

The outer surface of the dispersed non-film-forming particles is, by definition of component (D), an organic substance, preferably a non-film-forming polymer, but the interior of these particles may be and, at least for economy preferably is, a gas, most preferably air. Particles of this type, dispersed in liquid water, are commercially available from Rohm and Haas Co. under the trademark ROPAQUE™, with designating indicia OP-62 LO and OP-96. Gas-filled polymer-walled particles of this type have the interesting property that they act optically as opaque, substantially white, pigments. However, it has been found that once the particles are incorporated into an autodeposited coating, if the coating is heated sufficiently, it can be made irreversibly transparent. Thus by using these materials as component (D), white and other light opaque colors for autodeposited coatings can be obtained, or transparent autodeposited coatings can be obtained with sufficient heating. Light-colored opaque autodeposited coatings have not heretofore been practically available, although possibilities for obtaining such optical properties for autodeposited coatings have been taught in various patents.

Irrespective of its exact chemical and/or structural nature, when an at least initially non-transparent dried and cured autodeposited coating is desired from a process according to this invention, component (D) is preferably present in the autodepositing composition used in a volume, measured in milliliters (hereinafter usually abbreviated as "ml"), that has a ratio to the combined mass, measured in grams (hereinafter usually abbreviated as "g"), of the total of components (A) and (E) in the same composition that is at least, with increasing preference in the order given, 0.01, 0.03, 0.05, 0.070, 0.080, 0.090, or 0.100 ml/g. The volume of component (D) to be used in determining this ratio includes not only the volume of the solid part of component (D) but also the volume of any gas contained within any gas-tight solid walled space(s) within particles of component (D). Furthermore, when the cost per unit volume from component (D) that is incorporated into the dried and cured autodeposited coating formed in a process according to the invention is lower than the cost per the same unit of volume incorporated from components (A) and (B) into the dried and cured autodeposited coating, it is still more preferred, at least for economy, for the amount of component (D) in an autodeposited coating according to the invention to have a volume to mass ratio of component (D) to combined components (A) and (B) that is at least, with increasing preference in the order given, 0.20, 0.25, 0.30, 0.35, 0.40, 0.45, 0.50, 0.55, 0.60, or 0.64 ml/g, inasmuch as it has been found that the corrosion resistance of the autodeposited coating produced does not appear to be adversely affected by these ratios of component (D) to combined components (A) and (B).

Independently, in order to assure coating integrity, it is preferred that the ratio of the volume of component (D) to the mass of combined components (A) and (B) as defined above should not be greater than, with increasing preference in the order given, 2.0, 1.7, 1.4, 1.2, 1.0, or 0.8 ml/g.

Pigment and/or filler component (E) and soluble colorant component (F) may generally be selected for compositions according to this invention from materials established as satisfactory for similar uses in other organic film-forming liquid compositions, particularly in prior autodeposition baths. Whether either or both of these optional components are preferably present in a composition according to the invention depends primarily on whether an additionally pigmented and/or otherwise colored coating is desired. If it is, suitable pigments include, for example, carbon black, phthalocyanine blue, phthalocyanine green, quinacridone red, benzidene yellow, and titanium dioxide. Any pigments or soluble colorants that tend to react chemically with other constituents of a composition according to the invention or to destabilize any dispersed particles present in the composition should normally be avoided. Any pigment and/or soluble colorant used should be added to the composition in an amount which imparts to the coating the desired color and/or the desired depth or degree of hue. It should be understood that the specific amount used will be governed by the specific coloring materials used and the color of coating desired.

Generally, the presence of a coalescing agent component (G) in an autodepositing liquid composition according to the invention is preferred when component (A) is selected as described for the first especially preferred embodiment as described above, because without such a component the autodeposited coatings are usually very susceptible to blister formation, cracking, and/or debonding from the substrate during drying. This component is preferably selected from the group consisting of monoethers and monoesters of glycols, preferably glycols with at least one terminal hydroxy group. Monoethers of ethylene glycol are readily available and are effective in reducing the density of coating irregularities, but these monoethers of ethylene glycol are restricted in use by anti-pollution laws in many locations and also have been found to be more likely than monoethers of propylene glycol to destabilize the emulsions formed in products according to the invention. Therefore, monoethers of propylene glycol, particularly the n-butyl and phenyl monoethers of propylene glycol, are preferred among the monoethers. A particularly preferred monoester is the mono 2-methyl propionate of 2,2,4-trimethyl-1,3-pentanediol; this is the most preferred of all materials for component (G).

Examples of preferred, commercially available coalescing agents are shown in Table 1.

TABLE 1

| Coalescing Agent | | Molecular | Boiling Point, | % in Saturated Aqueous |
|---|---|---|---|---|
| Trade Name | Chemical Name | Weight | ° C. | Solution |
| Dowanol ™ PM | Propylene glycol monomethyl ether | 90.1 | 120.1 | Miscible |
| Dowanol ™ PtB | Propylene glycol mono-t-butyl ether | 132.2 | 151* | 14.5 |
| Dowanol ™ PnB | Propylene glycol mono-n-butyl ether | 132.2 | 170.2 | 6.4 |
| Dowanol ™ DPnB | Dipropylene glycol mono-n-butyl ether | 190.3 | 229 | 5 |
| Dowanol ™ TPM | Tripropylene glycol monomethyl ether | 206.3 | 242.4 | Miscible |
| Dowanol ™ PPh | Propylene glycol monophenyl ether | 152.2 | 242.7 | 5.4 |
| Texanol ™ | 2,2,4-trimethyl-1,3-pentanediol mono-2-ethyl propionate | 216.3 | 244–247 | <0.1 |

Footnote for Table 1
*This material forms an azeotrope with water that boils at 95° C.

Irrespective of its exact chemical composition, the percentage of component (G) in an autodepositing liquid composition according to the above described first especially preferred embodiment of the invention preferably is, with increasing preference in the order given, at least 5, 10, 12, 14, 16, 18, or 20% of the total solids in component (A) of the same autodepositing liquid composition as described above and independently preferably is, with increasing preference in the order given, not more than 30, 28, 26, 24, or 22% on the same basis.

In contrast, for the second especially preferred embodiment as described above, component (G) is not needed and is therefore preferably omitted for economy. For other types of polymers for component (A), the preference or lack of preference for coalescing agent (G) may be inferred from experience with prior art autodepositing compositions that contain the same type of polymer for component (A).

Optional solvent component (H) may be required during the preparation of autodepositing liquid compositions according to this invention, but it is not believed in most cases to contribute any desirable characteristic to the final autodepositing liquid compositions formed, and may even reduce the storage stability of these autodepositing liquid compositions. Therefore, when not needed, as it is not when either of the two especially preferred types of component (A) already described above, solvent component (H) is preferably omitted altogether. When solvent is required during preparation, as for example for autodepositing compositions in which a substantial amount of epoxy resin is incorporated, the solvent thus required may be later removed, when desired or necessary to comply with anti-pollution requirements, by means known in the art, such as distillation under reduced pressure of a mixture of the solvent and the desired active ingredient at a temperature at which the active ingredient will remain liquid, before formation of an oil-in-water type dispersion of the desired final components of an autodepositing liquid composition according to the invention. However, in some instances the solvents do not unacceptably diminish the technical benefits of the final autodepositing liquid compositions according to the invention, and may be left in place in the autodepositing liquid compositions according to the invention if legal requirements are not thereby violated. Any such residual solvent will normally be expelled during cure of the autodeposited coatings.

Any material effective as a plasticizer, for example those known in the art such as di(2-ethylhexyl) phthalate, may be used as optional component (J). Ordinarily, however, if one of the two especially preferred types of polymer component (A) is used, no such external plasticizer will be needed.

There are no particular difficulties involved in preparing an autodeposition composition according to the invention; the components may simply be mixed together, once both components (A) and (D) have been adequately emulsified separately, with anionic emulsifiers, to remain suspended in aqueous solutions. Normally, component (C) is added only a short time before beginning to use an autodeposition composition.

A process according to the invention for using an autodepositing liquid composition according to the invention in its simplest form comprises, preferably consists essentially of, or more preferably consists of, operations of:

(I) contacting a solid surface, which is capable of reacting with an autodeposition bath according to the invention to generate cations with a valence of at least two dissolved in the autodeposition bath, with an autodeposition bath according to the invention as described above for a sufficient time to form over the contacted solid surface a wet continuous coating which contains molecules derived from component (A) and particles derived from component (D) of the autodepositing liquid composition according to the invention, the wet continuous coating being sufficiently coherent and adherent to the solid surface for at least some part thereof to remain on the solid surface against the force of natural ambient gravity when the solid surface and any non-adherent part of the autodepositing liquid composition according to the invention are removed from contact with each other;

(II) after operation (I) as described immediately above, removing the wet continuous coating formed over the solid surface from contact with any non-adherent part of the autodepositing liquid composition according to the invention with which it was contacted in operation (I) and, optionally, rinsing the coating with at least one liquid rinse composition that is not an autodepositing liquid composition; and (III) after operation (II), expelling from the wet continuous coating a sufficient amount of water and, optionally, other materials so as to convert it into a dry continuous solid coating in place over the solid surface contacted in operation (I).

All operations of a conventional autodeposition process after the formation of the wet autodeposited coating containing characterizing component (D) according to this invention may be performed in the same manner for a process according to this invention as for a prior art process, except that the susceptibility of the opacity developed in an autodeposited coating according to the above noted preferred embodiments of this invention to be converted to transparency by heating must not be lost sight of. As a result of this susceptibility, when a non-transparent coating is desired, it may be necessary to deviate from previous process operations that utilized cure at high temperatures and substitute longer cure at lower temperatures. With the most preferred type of component (D) as indicated above, for example, heating for 15 minutes at 176° C. made completely transparent an initially nearly opaque coating that contained 0.10 ml of component (D) per gram of (dried) component (A) and had been initially cured at 125° C. for 20 minutes.

As with prior art autodeposition processes, for most substrate surfaces the corrosion resistance achieved can be substantially improved by including contact between the wet autodeposited coating and a rinse liquid as part of operation (II) as described above. Suitable, but not exhaustively suitable, rinse liquids are described in the following U.S. Patents, each of which, to the extent that it teaches rinsing of wet autodeposited coatings before drying them and is not contrary to any explicit statement herein, is hereby incorporated herein by reference: 5,667,845 of Sep. 16, 1997 to Roberto et al.; 5,342,694 of Aug. 30, 1994 to Ahmed et al.; 5,248,525 of Sep. 28, 1993 to Siebert; and 4,637,839 of Jan. 20, 1987 to Hall. More particularly, for the first especially preferred embodiment of the invention as described above, which utilizes acrylic film-forming resin, rinse liquids that contain hexavalent chromium, optionally along with some trivalent chromium, are preferred, while for the second especially preferred embodiment as described above, which utilizes polymers of predominantly vinylidene chloride as the film-forming resin component, rinse liquids with ammonium bicarbonate are preferred.

The rinse solution may be contacted, in a process according to the invention, with a wet uncured autodeposited coating by any convenient method or combination of methods, such as spraying, curtain coating, or immersion, with the latter normally preferred. Preferably the time of contact between the rinse solution and the wet uncured autodeposited coating is, with increasing preference in the order given, not less than 5, 10, 20, 30, 40, 45, 50, 55, or 60 seconds (hereinafter often abbreviated as "sec") and independently preferably is, with increasing preference in the order given, not more than 600, 400, 200, 120, 110, 100, 95, or 90 sec. The temperature of the rinse solution during contact with a wet uncured autodeposited coating may be any temperature at which the rinse solution is liquid but normally preferably is, with increasing preference in the order given, not less than 10, 15, 18, or 20° C. and independently preferably, primarily for reasons of economy, is not more than, with increasing preference in the order given, 60, 45, 35, 30, 27, 25, or 23° C.

After the reaction rinse treatment, the wet autodeposited coating as modified by contact with the reaction rinse is sometimes rinsed again with water, preferably deionized water if any, before being dried and, if desired as is usually preferred, cured by heating at an elevated temperature so selected that the protective properties of the coating are fully developed but not adversely affected. The temperature and time of treatment will depend on the nature of the particular film-forming resin, i.e., component (A), in the autodeposited coating and the thickness of the coating. With autodeposition baths containing most types of acrylic organic film-forming resins, the autodeposited coatings preferbly are heated, during or after drying, to a temperature that is, with increasing preference in the order given, at least 90, 100, 110, 120, 130, 140, or 145° C. and independently preferably is, with increasing preference in the order given, not more than 230, 220, 200, 190, 180, 170, 160, or 165° C. When the film-forming resin used consists predominantly of vinylidene chloride residues, maximum temperature to which the resulting autodeposited coating is heated during its drying and curing preferably is at least, with increasing preference in the order given, 30, 50, 70, 80, 85, 90, 95, or 100° C. and independently preferably is not more than, with increasing preference in the order given, 150, 140, 130, 125, 120, 115, 110, or 105° C.

Times of heating for curing preferably range from 5 seconds up to 30 minutes, dependent on the mass of the coated article. Preferably, the coating is heated for a period of time until the metallic substrate has reached the temperature of the heated environment, typically in a forced air baking oven.

The invention and its benefits may be further appreciated from the working examples and comparison examples set forth below.

PREPARATION AND USE OF COMPOSITIONS INCLUDING DISPERSED NON-FILM-FORMING ORGANIC PARTICLES

Group 1 With Acrylic Polymer Film-Forming Resin

In these examples, RHOPLEX™ WL-91 acrylic latex (hereinafter usually abbreviated as "WL-91") commercially supplied by Rohm & Haas Co., usually diluted with additional water, and with DOWFAX™ 2A1 surfactant (hereinafter usually abbreviated as "2A1") added as supplemental emulsifying agent, was used as a primary precursor dispersion supplying all of film-forming polymer component (A) and at least part of emulsifying agent component (B) of an eventual autodepositing liquid composition according to the invention. This WL-91 product is reported by its supplier to contain 41–42% of solids, of which at least 95% is believed to be acrylic polymer solids and any remainder to be emulsifying agent; the chemical nature and exact amount of the emulsifying agent are not disclosed by the supplier. ROPAQUE™ OP-96 pigment dispersion (hereinafter usually abbreviated as "OP-96") commercially supplied by Rohm and Haas Co. was the source of component (D); according to its supplier, this material contains 30.5% solids in the form of particles averaging 0.55 $\mu$m in size and normally having at least one airfilled interior space per particle, so that the volume percent of the total dispersion occupied by its solid content and the gas-tight spaces within the particles of its solids content is 50%, and each gram of the dried dispersion occupies 1.59 ml of volume.

A base autodeposition bath was prepared; it consisted of, in addition to water: 5.7% of solids from WL-91; 1.21% of Texanol™ coalescing agent; 0.04% of 2A1 emulsifying agent; sufficient dissolved hydrofluoric acid to give the total composition a pH of 2.3; sufficient ferric fluoride to supply, together with the hydrofluoric acid, 1.8 g of fluoride ions per liter of total composition, and sufficient hydrogen peroxide to provide, together with the other components, an oxidizing potential for the total solution that was 330 mV more oxidizing than a standard hydrogen electrode. Successive additions of the OP-96 product were added to this base autodeposition bath to produce autodeposition compositions according to the invention with the component (D) volume to component (A) solids ratios shown in Table 2. Standard test panels were given an autodeposited coating by immersion for 90 seconds in most of these autodeposition compositions according to the invention, which were maintained at normal ambient temperature of 22±5° C., with other processing conditions also given in Table 2.

TABLE 2

| Identifying Number(s) | Ratio, [ml of (D)]/ [g of (A)] | Post Rinse | Drying/Curing Temperature(s) and Time(s) | | | | Coating Appearance |
|---|---|---|---|---|---|---|---|
| | | | 1st ° C. | 1st Min. | 2nd ° C. | 2nd Min. | |
| 1 | 0.10 | Water | 125 | 20 | none | none | Off-white |
| 2 | 0.10 | Water | 125 | 20 | 176 | 15 | Transparent |
| 3 | 0.10 | 1087 RR | 125 | 60 | none | none | Off-white |
| 4 | 0.10 | 1087 RR | 125 | 30 | 145 | 30 | Off-white |
| 5 | 0.21 | 1087 RR | 125 | 20 | none | none | Off-white |
| 6 | 0.21 | 1087 RR | 145 | 20 | none | none | Off-white |
| 7 | 0.21 | Water | 125 | 20 | none | none | Whiter than #'s 1 and 2 |
| 8 | 0.21 | Water | 145 | 20 | none | none | |
| 9, 10 | 0.21 | Water | 176 | 20 | none | none | Transparent |
| 11, 12 | 0.31 | Water | 145 | 30 | none | none | Opaque, whiter than #'s 7 and 8 |
| 13 | 0.31 | 1087 RR | 145 | 25 | none | none | Whiter than #'s 5 and 6 |
| 14 | 0.31 | 1087 RR | 145 | 45 | none | none | |
| 15, 16 | 0.43 | Water | 145 | 20 | none | none | Opaque white |
| 17 | 0.43 | 1087 RR | 145 | 20 | none | none | Whiter than |

TABLE 2-continued

| Identifying Number(s) | Ratio, [ml of (D)]/ [g of (A)] | Post Rinse | Drying/Curing Temperature(s) and Time(s) | | | | Coating Appearance |
|---|---|---|---|---|---|---|---|
| | | | 1st ° C. | 1st Min. | 2nd ° C. | 2nd Min. | |
| 18 | 0.43 | 1087 RR | 145 | 40 | none | none | #'s 13 and 14 |
| 19, 20 | 0.65 | Water | 145 | 20 | none | none | Opaque white |
| 21 | 0.65 | 1087 RR | 145 | 20 | none | none | Both had |
| 22 | 0.65 | 1087 RR | 145 | 40 | none | none | same appearance |
| 23, 24 | 0.65 | Water | 175 | 20 | none | none | Transparent |
| 25, 26 | 0.65 | 1087 RR | 175 | 20 | none | none | Brown |

Abbreviations for Table 2
"Min." means "minute(s)"; "1087 RR" means "a solution of AUTOPHORETIC ® 1087 Reaction Rinse, commercially available from Henkel Surface Technologies, Madison Heights, Michigan, used as directed by supplier"; "#" means "number".
Footnote for Table 2
*Some chromium is believed to be retained in and to darken the dried and cured coating when 1087 RR is used.

Group 2 With Poly(Vinylidene Chloride) Film-Forming Resin

In these examples, a self-emulsified poly(vinylidene chloride) latex diluted with additional water was used to supply all of film-forming polymer component (A) and all of emulsifying agent component (B), except for whatever emulsifying agent is included in OP-96 as described above. As for Group 1, a base autodeposition bath was prepared. For this group the base autodeposition bath consisted of, in addition to water: 5.4% of self-emulsifying film-forming polymer; sufficient dissolved hydrofluoric acid to give the total composition a pH of 2.3; sufficient ferric fluoride to supply, together with the hydrofluoric acid, 1.8 g of fluoride ions per liter of total composition, and sufficient hydrogen peroxide to provide, together with the other components, an oxidizing potential for the total solution that was 330 mV more oxidizing than a standard hydrogen electrode. Successive additions of the OP-96 product were added to this base autodeposition bath to produce autodeposition compositions according to the invention with the component (D) volume to component (A) solids ratios shown in Table 3. Standard test panels were given an autodeposited coating by immersion for 90 seconds in most of these autodeposition compositions according to the invention, which were maintained at normal ambient temperature of 22±5° C. All of these coatings were dried and cured for 20 minutes at 104° C. Other processing conditions are given in Table 3.

TABLE 3

| Identifying Number(s) | Ratio, [ml of (D)]/[g of (A) and (B)] | Post Rinse Liquid | Coating Appearance |
|---|---|---|---|
| 27–32 | 0.12 | 2150 RR | Light yellow*, nearly opaque |
| 33, 34 | 0.12 | Water | White, nearly opaque |
| 35, 36 | 0.37 | Water | White, opaque |
| 37–40 | 0.37 | 2150 RR | Yellowed*, opaque |

Abbreviations for Table 3
"2150 RR" means "a solution of AUTOPHORETIC ®2 150 Reaction Rinse, commercially available from Henkel Surface Technologies, Madison Heights, Michigan, used as directed by supplier".
Footnote for Table 3
*More iron is believed to be retained in and to darken the dried and cured coating when 2150 RR is used.

CORROSION TESTING

Some of the test panels prepared in Groups 1 and 2 were conventionally scribed and subjected to neutral salt spray tests according to American Society for Testing and Materials Standard Procedure B-117 for 500 hours. The ratio of volume of component (D) to mass of component (A) within the range tested had no substantial effect on the corrosion resistance. Higher times and/or temperatures of drying and curing improved corrosion resistance in Group 1, as expected for similar autodeposited coatings without the addition of component (D) with this type of film-forming resin. Detailed results are shown in Table 4.

TABLE 4

| Identifying Number(s) | Creep Width and Any Other Observations after 500 Hours |
|---|---|
| 4 | 4 millimeters |
| 5 | 16 millimeters |
| 6 | 14 millimeters |
| 13 | 16 millimeters |
| 14 | 18 millimeters |
| 17 | 13 millimeters |
| 18 | 15 millimeters |
| 21 | 15 millimeters |
| 22 | 11 millimeters |
| 25 | 7 millimeters; creep uneven |
| 27 | 2 millimeters |
| 31 | 2 millimeters |
| 32 | 2 millimeters |
| 35 | 2–3 millimeters |
| 37 | 2–3 millimeters; a few spots of field rust |

What is claimed is:
1. An autodepositing liquid composition comprising water and the following components:
(A) at least 1.0%, based on the whole composition, of a component of dissolved, dispersed, or both dissolved and dispersed film forming polymer molecules;
(B) an emulsifying agent component in sufficient quantity to emulsify any water insoluble part of any other component so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal that reacts with the autodepositing liquid composition to produce therein dissolved metal cations with a charge of at least two;
(C) a dissolved accelerator component selected from the group consisting of acids, oxidizing agents, and com- plexing agents that are not part of immediately previously recited components (A) or (B), this accelerator component being sufficient in strength and amount to impart to the total autodepositing liquid composition an oxidation-reduction potential that is at least 100 mV more oxidizing than a standard hydrogen electrode; and (D) a component of dispersed gas-filled non-film-forming polymer walled particles that are not part of any of immediately previously recited components (A) through (C), wherein the volume, measured in ml, of component (D) in the composition has a ratio to the mass, measured in grams, of the total of components (A) and (B) in the same composition that is at least about 0.01 ml/g.

2. An autodepositing liquid composition comprising water and the following components (A) at least 1.0%, based on the whole composition, of a component of dissolved, dispersed, or both dissolved and dispersed film forming polymer molecules selected from molecules that contain the following subcomponents in the amounts indicated below:
  (A1) from about 2.0 to about 7.0 percent of a subcomponent selected from residues of polymerization of acrylic and methacrylic acids and the salts of both of these acids;
  (A2) from about 15 to about 50 percent of a subcomponent selected from residues of polymerization of esters of acrylic and methacrylic acids with alcohols that contain at least 4 but not more than 20 carbon atoms per molecule;
  (A3) from about 10 to about 50 percent of a subcomponent selected from residues of addition-polymerizable hydrocarbon molecules; and
  (A4) from about 10 to about 40 percent of a subcomponent of residues of acrylic monomers that are not part of either subcomponent (A1) or (A2) as described immediately above;

(B) an emulsifying agent component in sufficient quantity to emulsify any water insoluble part of any other component so that, in the autodepositing liquid composition, no separation or segregation of bulk phases that is perceptible with normal unaided human vision occurs during storage at 25° C. for at least 24 hours after preparation of the autodepositing liquid composition, in the absence of contact of the autodepositing liquid composition with any metal that reacts with the autodepositing liquid composition to produce therein dissolved metal cations with a charge of at least two;

(C) a dissolved accelerator component selected from the group consisting of acids, oxidizing agents, and complexing agents that are not part of immediately previously recited components (A) or (B), this accelerator component being sufficient in strength and amount to impart to the total autodepositing liquid composition an oxidation-reduction potential that is at least 100 mV more oxidizing than a standard hydrogen electrode, wherein component (C) is comprised of the following three subcomponents:
    (C1) from about 0.8 to about 4.0 g/l of fluoride ions;
    (C2) an amount of oxidizing agent that provides to the autodepositing liquid composition an oxidation potential that is from about 200 to about 500 mV more oxidizing than a standard hydrogen electrode; and
    (C3) a source of hydrogen cations in an amount sufficient to impart to the autodeposition bath a pH that is from about 1.0 to about 3.8; and (D) a component of dispersed non-film-forming organic particles that are not part of any of immediately previously recited components (A) through (C).

3. An autodepositing liquid composition according to claim 2, wherein:

component (A) is selected from molecules that contain the following subcomponents in the amounts indicated below:
  (A1) from about 3.5 to about 6.5 percent of a subcomponent selected from residues of polymerization of methacrylic acid and its salts;
  (A2) from about 26 to about 39 percent of a subcomponent selected from residues of polymerization of esters of acrylic and methacrylic acids with alcohols that contain at least 8 but not more than 10 carbon atoms per molecule;
  (A3) from about 32 to about 44 percent of a subcomponent selected from residues of addition-polymerizable hydrocarbon molecules that contain an aromatic nucleus; and
  (A4) from about 17 to about 30 percent of a subcomponent of residues of acrylic monomers that are not part of either subcomponent (A1) or (A2) as described immediately above;

component (C) contains the following three subcomponents:
  (C1) from about 1.60 to about 2.10 g/l of fluoride ions;
  (C2) an amount of hydrogen peroxide and ferric ions that provides to the autodepositing liquid composition an oxidation potential that is from about 350 to about 400 mV more oxidizing than a standard hydrogen electrode; and
  (C3) a source of hydrogen cations in an amount sufficient to impart to the autodeposition bath a pH that is from about 2.0 to about 2.6; and there is also contained a component (G) selected from the group consisting of monoethers and monoesters of glycols with at least one terminal hydroxy group, the mass of component (G) being from about 10 to about 30% of the mass of solids in component (A) of the same composition.

4. An autodepositing liquid composition according to claim 1, wherein:

component (A) incorporates component (B) and is selected from molecules including residues of vinylidene chloride that constitute from 50 to 99% of the mass of the molecules and residues of sulfoethylmethacrylate that constitute from 0.1 to 5% of the mass of the molecules and, optionally, residues of one or more other comonomers selected from the group consisting of vinyl chloride, acrylonitrile, acrylamides, and methacrylamides; and component (C) contains the following three subcomponents:
  (C1) from about 0.8 to about 4.0 g/l of fluoride ions;
  (C2) an amount of oxidizing agent that provides to the autodepositing liquid composition an oxidation potential that is from about 200 to about 500 mV more oxidizing than a standard hydrogen electrode; and
  (C3) a source of hydrogen cations in an amount sufficient to impart to the autodeposition bath a pH that is from about 1.0 to about 3.8.

5. An autodepositing liquid composition according to claim 4, wherein component (C) contains the following three subcomponents:

(C1) from about 1.60 to about 2.10 g/l of fluoride ions;

(C2) an amount of hydrogen peroxide and ferric ions that provides to the autodepositing liquid composition an oxidation potential that is from about 350 to about 400 mV more oxidizing than a standard hydrogen electrode; and (C3) a source of hydrogen cations in an amount sufficient to impart to the autodeposition bath a pH that is from about 2.0 to about 2.6.

6. An autodepositing liquid composition according to claim 1, wherein:

component (D) is selected from said gas-filled non-film-forming polymer walled particles having sizes such that:
the average size of the particles, based on their largest linear dimension, is from about 0.2 to about 1.0 $\mu$m;
at least about 75 number percent of the particles have a size that is at least 62% of the average size;
at least about 70 number percent of the particles have a size that is at least 76% of the average size;
at least about 50 number percent of the particles have a size that is at least 86% of the average size;
not more than about 25 number percent of the particles have a size that is at least 114% of the average size;
not more than about 10 number percent of the particles have a size that is at least 124% of the average size; and
not more than about 1 number percent of the particles have a size that is at least 170% of the average size;
the volume, measured in ml, of component (D) in the composition has a ratio to the mass, measured in grams, of the total of components (A) and (B) in the same composition that is within a range from 0.20 to 2.0 ml/g.

7. An autodepositing liquid composition according to claim 4, wherein:

component (D) is selected from said gas-filled non-film-forming polymer walled particles having sizes such that:
the average size of the particles, based on their largest linear dimension, is from about 0.2 to about 1.0 $\mu$m;
at least about 75 number percent of the particles have a size that is at least 62% of the average size;
at least about 70 number percent of the particles have a size that is at least 76% of the average size,
at least about 50 number percent of the particles have a size that is at least 86% of the average size;
not more than about 25 number percent of the particles have a size that is at least 114% of the average size;
not more than about 10 number percent of the particles have a size that is at least 124% of the average size; and
not more than about 1 number percent of the particles have a size that is at least 170% of the average size; and
the volume, measured in ml, of component (D) in the composition has a ratio to the mass, measured in grams, of the total of components (A) and (B) in the same composition that is within a range from 0.20 to 2.0 ml/g.

8. An autodepositing liquid composition according to claim 3, wherein:

component (D) is selected from said gas-filled non-film-forming polymer walled particles having sizes such that:
the average size of the particles, based on their largest linear dimension, is from about 0.2 to about 1.0 $\mu$m;
at least about 75 number percent of the particles have a size that is at least 62% of the average size;
at least about 70 number percent of the particles have a size that is at least 76% of the average size;
at least about 50 number percent of the particles have a size that is at least 86% of the average size;
not more than about 25 number percent of the particles have a size that is at least 114% of the average size;
not more than about 10 number percent of the particles have a size that is at least 124% of the average size; and
not more than about 1 number percent of the particles have a size that is at least 170% of the average size; and
the volume, measured in ml, of component (D) in the composition has a ratio to the mass, measured in grams, of the total of components (A) and (B) in the same composition that is within a range from 0.20 to 2.0 ml/g.

9. An autodepositing liquid composition according to claim 2, wherein:

component (D) is selected from said gas-filled non-film-forming polymer walled particles having sizes such that:
the average size of the particles, based on their largest linear dimension, is from about 0.2 to about 1.0 $\mu$m;
at least about 75 number percent of the particles have a size that is at least 62% of the average size;
at least about 70 number percent of the particles have a size that is at least 76% of the average size;
at least about 50 number percent of the particles have a size that is at least 86% of the average size;
not more than about 25 number percent of the particles have a size that is at least 114% of the average size;
not more than about 10 number percent of the particles have a size that is at least 124% of the average size; and
not more than about 1 number percent of the particles have a size that is at least 170% of the average size; and
the volume, measured in ml, of component (D) in the composition has a ratio to the mass, measured in grams, of the total of components (A) and (B) in the same composition that is within a range from 0.20 to 2.0 ml/g.

10. An autodepositing liquid composition according to claim 1, wherein:

the volume, measured in ml, of component (D) in the composition has a ratio to the mass, measured in grams, of the total of components (A) and (B) in the same composition that is at least about 0.09 ml/g.

11. A process for forming an autodeposited coating, said process comprising operations of:

(I) contacting a solid surface, which is capable of reacting with an autodepositing liquid composition to generate cations with a valence of at least two dissolved in an autodepositing liquid composition, with an autodepositing liquid composition according to claim 1 for a sufficient time to form over the contacted solid surface a wet continuous coating which contains molecules derived from component (A) and particles derived from component (D) of the autodepositing liquid composition, the wet continuous coating being sufficiently coherent and adherent to the solid surface for at least some part thereof to remain on the solid surface against the force of natural ambient gravity when the solid surface and any non-adherent part of the autodepositing liquid composition according to the invention are removed from contact with each other;

(II) after operation (I) as described immediately above, removing the wet continuous coating formed over the solid surface from contact with any non-adherent part of the autodepositing liquid composition according to the invention with which it was contacted in operation (I) and, optionally, rinsing the coating with at least one liquid rinse composition that is not an autodepositing liquid composition; and (III) after operation (II), expelling from the wet continuous coating a sufficient amount of water and, optionally, other materials so as to convert it into a dry continuous solid coating in place over the solid surface contacted in operation (I).

12. A process according to claim 11, wherein:

the autodepositing liquid composition utilized in operation (I) comprises a component (D) that is selected from said gas-filled non-film-forming polymer walled particles that act as a white pigment for the autodepositing liquid composition;

the volume, measured in ml, of said gas-filled non-film-forming-polymer-walled particles in the composition has a ratio to the mass, measured in grams, of the total of components (A) and (B) in the same composition that is at least about 0.10 ml/g; and in operation (III), the temperature of the solid coating is controlled so that the autodeposited coating does not become transparent.

13. A liquid replenisher composition that comprises water and:

(A') at least 10%, based on the whole composition, of dissolved, dispersed, or both dissolved and dispersed film forming polymer molecules;

(B') an emulsifying agent component in sufficient quantity to emulsify any water insoluble part of any other component so that, in the liquid replenisher composition, no separation or segregation of bulk phases that is perceptible with normal unaided human vision occurs during storage at 25° C. for at least 24 hours after preparation of the liquid replenisher composition, in the absence of contact of the liquid replenisher composition with any metal that reacts with the liquid replenisher composition to produce therein dissolved metal cations with a charge of at least two; and (D') a component of dispersed gas-filled non-film-forming polymer walled particles that are not part of either of immediately previously recited components (A') or (B'), wherein the volume, measured in ml, of component (D) in the composition has a ratio to the mass, measured in grams, of the total of components (A) and (B) in the same composition that is at least about 0.01 ml/g.

14. A liquid replenisher composition comprising water and:

(A') at least 10%, based on the whole composition, of dissolved, dispersed, or both dissolved and dispersed film forming polymer molecules selected from molecules that contain the following subcomponents in the amounts indicated below:

(A'1) from about 2.0 to about 7.0 percent of a subcomponent selected from residues of polymerization of acrylic and methacrylic acids and the salts of both of these acids;

(A'2) from about 15 to about 50 percent of a subcomponent selected from residues of polymerization of esters of acrylic and methacrylic acids with alcohols that contain at least 4 but not more than 20 carbon atoms per molecule;

(A'3) from about 10 to about 50 percent of a subcomponent selected from residues of addition-polymerizable hydrocarbon molecules; and (A'4) from about 10 to about 40 percent of a subcomponent of residues of acrylic monomers that are not part of either subcomponent (A'1) or (A'2) as described immediately above;

(B') an emulsifying agent component in sufficient quantity to emulsify any water insoluble part of any other component so that, in the liquid replenisher composition, no separation or segregation of bulk phases that is perceptible with normal unaided human vision occurs during storage at 25° C. for at least 24 hours after preparation of the liquid replenisher composition, in the absence of contact of the liquid replenisher composition with any metal that reacts with the liquid replenisher composition to produce therein dissolved metal cations with a charge of at least two; and (D') a component of dispersed non-film-forming organic particles that are not part of either of immediately previously recited components (A') or (B').

15. A liquid replenisher composition according to claim 14, wherein:

component (A') is selected from molecules that contain the following subcomponents in the amounts indicated below:

(A'1) from about 3.5 to about 6.5 percent of a subcomponent selected from residues of polymerization of methacrylic acid and its salts;

(A'2) from about 26 to about 39 percent of a subcomponent selected from residues of polymerization of esters of acrylic and methacrylic acids with alcohols that contain at least 8 but not more than 10 carbon atoms per molecule;

(A'3) from about 32 to about 44 percent of a subcomponent selected from residues of addition-polymerizable hydrocarbon molecules that contain an aromatic nucleus; and (A'4) from about 17 to about 30 percent of a subcomponent (A'4) of residues of acrylic monomers that are not part of either subcomponent (A'1) or (A'2) as described immediately above; and there is also contained a component (G') selected from the group consisting of monoethers and monoesters of glycols with at least one terminal hydroxy group, the mass of component (G') being from about 10 to about 30% of the mass of solids in component (A') of the same composition.

16. A liquid replenisher composition according to claim 13, wherein component (A') incorporates component (B') and is selected from molecules including:

residues of vinylidene chloride that constitute from 50 to 99% of the mass of the molecules; and residues of sulfoethylmethacrylate that constitute from 0.1 to 5% of the mass of the molecules; and, optionally, residues of one or more other comonomers selected from the group consisting of vinyl chloride, acrylonitrile, acrylamides, and methacrylamides.

17. A liquid replenisher composition according to claim 13, wherein:

component (D') is selected from said gas-filled non-film-forming polymer walled particles having sizes such that:
  the average size of the particles, based on their largest linear dimension, is from about 0.2 to about 1.0 µm;
  at least about 75 number percent of the particles have a size that is at least 62% of the average size;
  at least about 70 number percent of the particles have a size that is at least 76% of the average size;
  at least about 50 number percent of the particles have a size that is at least 86% of the average size;
  not more than about 25 number percent of the particles have a size that is at least 114% of the average size;
  not more than about 10 number percent of the particles have a size that is at least 124% of the average size; and
  not more than about 1 number percent of the particles have a size that is at least 170% of the average size; and
the volume, measured in ml, of component (D') in the composition has a ratio to the mass, measured in grams, of the total of components (A') and (B') in the same composition that is within a range from 0.20 to 2.0 ml/g.

18. A liquid replenisher composition according to claim 14, wherein:
component (D') is selected from said gas-filled non-film-forming polymer walled particles having sizes such that:
  the average size of the particles, based on their largest linear dimension, is from about 0.2 to about 1.0 µm;
  at least about 75 number percent of the particles have a size that is at least 62% of the average size;
  at least about 70 number percent of the particles have a size that is at least 76% of the average size;
  at least about 50 number percent of the particles have a size that is at least 86% of the average size;
  not more than about 25 number percent of the particles have a size that is at least 114% of the average size;
  not more than about 10 number percent of the particles have a size that is at least 124% of the average size; and
  not more than about 1 number percent of the particles have a size that is at least 170% of the average size; and
the volume, measured in ml, of component (D') in the composition has a ratio to the mass, measured in grams, of the total of components (A') and (B') in the same composition that is within a range from 0.20 to 2.0 ml/g.

19. An autodepositing liquid composition according to claim 1 wherein the gas in the gas-filled non-film-forming polymer walled particles of component (D) is air.

20. An liquid replenisher composition according to claim 13 wherein the gas in the gas-filled non-film-forming polymer walled particles of component (D) is air.

* * * * *